United States Patent
Ishiwatari

(10) Patent No.: US 8,494,217 B2
(45) Date of Patent: Jul. 23, 2013

(54) IMAGE PROCESSING APPARATUS, IMAGE PROCESSING METHOD, AND PROGRAM

(75) Inventor: Hiroyuki Ishiwatari, Kanagawa (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 12/610,772

(22) Filed: Nov. 2, 2009

(65) Prior Publication Data

US 2010/0128928 A1      May 27, 2010

(30) Foreign Application Priority Data

Nov. 27, 2008   (JP) ................. 2008-302279

(51) Int. Cl.
*G06K 9/00* (2006.01)
(52) U.S. Cl.
USPC ........................................ 382/103
(58) Field of Classification Search
None
See application file for complete search history.

(56) References Cited

U.S. PATENT DOCUMENTS

| 7,834,919 B2 * | 11/2010 | Yachi ............................ 348/241 |
| 2005/0031176 A1 * | 2/2005 | Hertel et al. .................. 382/128 |
| 2008/0211915 A1 * | 9/2008 | McCubbrey .................. 348/159 |

* cited by examiner

*Primary Examiner* — Claire X Wang
*Assistant Examiner* — Thomas A James
(74) *Attorney, Agent, or Firm* — Oblon, Spivak, McClelland, Maier & Neustadt, L.L.P.

(57) ABSTRACT

There is provided an image processing apparatus including a dynamic body detecting unit for detecting a dynamic body contained in a moving image, a dynamic body region setting unit for, during a predetermined time from a time point the dynamic body is detected by the dynamic body detecting unit, setting a region containing the dynamic body at the detection time point as a dynamic body region, and a fluctuation removable processing unit for performing a fluctuation removal process on a region other than the dynamic body region set by the dynamic body region setting unit.

8 Claims, 7 Drawing Sheets

(ORGANIZATION OF ISSUES)

(OUTLINE OF SUPER-RESOLUTION PROCESS)

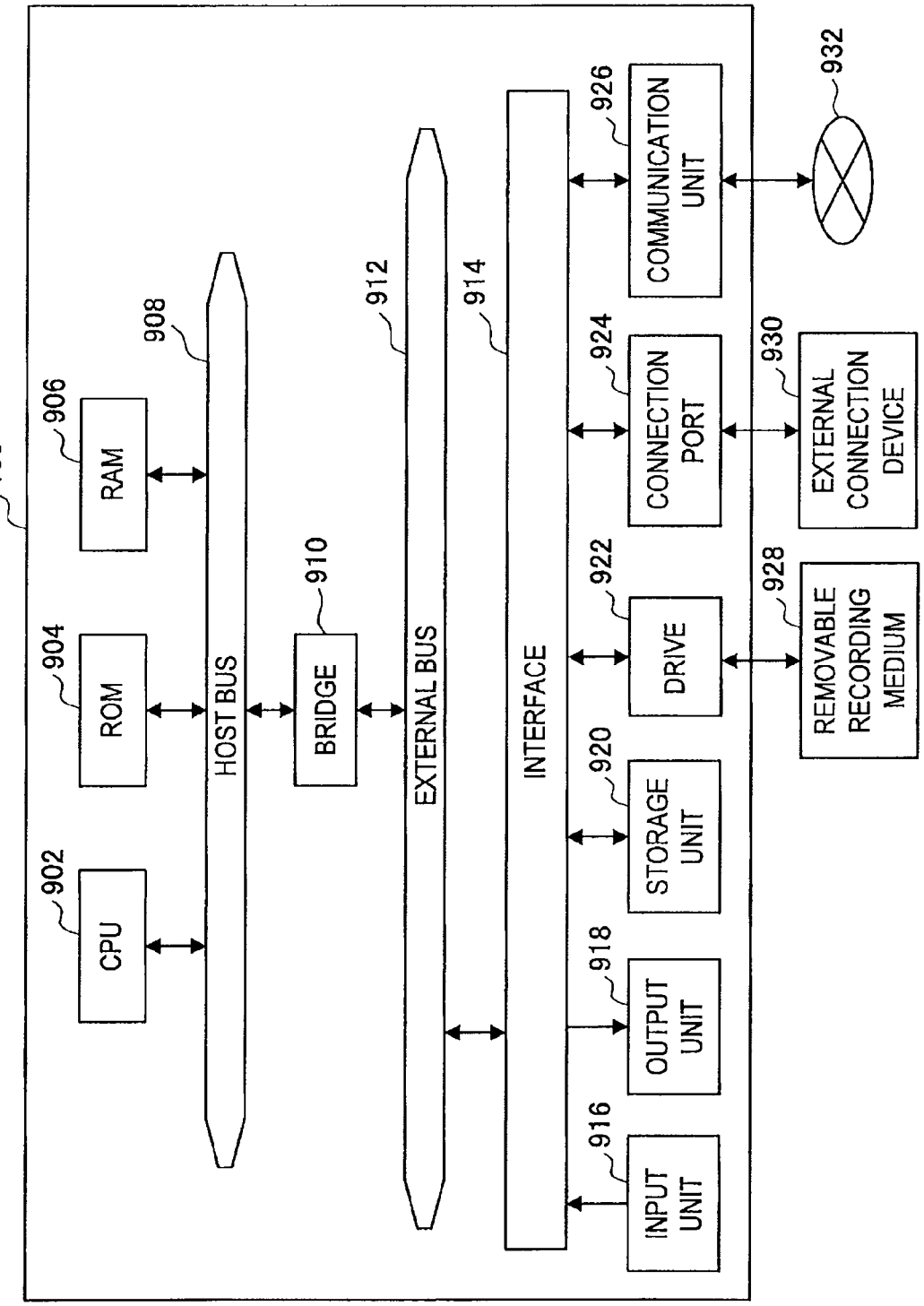

IMAGE PROCESSING APPARATUS, IMAGE
PROCESSING METHOD, AND PROGRAM

BACKGROUND OF THE INVENTION

1. Field of the Invention

The present invention relates to an image processing apparatus, an image processing method, and a program.

2. Description of the Related Art

When photographing a moving image with a video camera and the like, fluctuation may occur in the photographed image due to the influence of fluctuation of air. Such fluctuation of air is thought to occur when the index of refraction of light locally changes due to temperature difference and the like. When photographing a distant view using a telescopic lens, the light path becomes long as the distance from the subject to the video camera is large. Thus, when using the telescopic lens, the photographed image may be greatly influenced by the fluctuation of air and a noticeable fluctuation may appear in the photographed image. Specifically, in the image subjected to the influence of fluctuation, part of the subject that is originally linear appears undulating or a portion that appears distorted may be contained.

Such influence of fluctuation appears as a phenomenon in which the coordinate position of each pixel configuring the image varies within a local region. Thus, the influence of fluctuation can be removed by correcting the coordinate position of each pixel in the image. For instance, the influence of fluctuation with respect to the stationary subject can be easily removed by combining a filtering process such as an averaging process and a median process. However, the image degrades if the filtering process is performed on the moving subject rather than removing the influence of fluctuation. With regards to such issue, Japanese Patent Application Laid-Open No. 2008-160733 discloses a technique of detecting the moving subject using a dynamic body detecting technique, and performing the filtering process only on the stationary subject. Through the use of such technique, the filtering process will not be performed on an image region of the moving subject, and degradation of the image by such filtering process can be prevented.

SUMMARY OF THE INVENTION

The technique disclosed in Japanese Patent Application Laid-Open No. 2008-160733 is based on the assumption that the moving subject can be correctly detected by the dynamic body detecting process. However, the moving subject may not actually be correctly detected as the dynamic body by the dynamic body detecting process. Thus, the filtering process might be performed on the moving subject, whereby part of the moving subject may disappear or the image quality may degrade only at the relevant portion.

The present invention has been made in view of the above issues, and it is desirable to provide a novel and improved image processing apparatus, an image processing method, and a program capable of avoiding the image quality from degrading due to the fluctuation removal process even if part of the moving subject is not correctly recognized as the dynamic body.

According to an embodiment of the present invention, there is provided an image processing apparatus including a dynamic body detecting unit for detecting a dynamic body contained in a moving image, a dynamic body region setting unit for, during a predetermined time from a time point the dynamic body is detected by the dynamic body detecting unit, setting a region containing the dynamic body at the detection time point as a dynamic body region, and a fluctuation removable processing unit for performing a fluctuation removal process on a region other than the dynamic body region set by the dynamic body region setting unit.

The fluctuation removal processing unit may perform other fluctuation removal process, in which a video of the dynamic body region contained in the dynamic body region does not disappear, on part of or the entire dynamic body region set by the dynamic body region setting unit.

The image processing apparatus may further include a super-resolution processing unit for performing a super-resolution process on part of or the entire dynamic body region not performed with the other fluctuation removal process by the fluctuation removal processing unit of the dynamic body region set by the dynamic body region setting unit.

The fluctuation removal process performed on an entire region of the moving image excluding the dynamic body region by the fluctuation removal processing unit may be an averaging process or a median process of a pixel value contained in each frame of the moving image. Furthermore, the fluctuation removal process performed on the dynamic body region may be a fluctuation removal process based on a non-rigid body registration.

According to another embodiment of the present invention, there is provided An image processing method including the steps of detecting a dynamic body contained in a moving image, setting, during a predetermined time from a time point the dynamic body is detected in the dynamic body detecting step, a region containing the dynamic body at the detection time point as a dynamic body region, and performing a fluctuation removal process on an entire region of the moving image excluding the dynamic body region set in the dynamic body region setting step.

According to another embodiment of the present invention, there is provided a program for causing a computer to execute a dynamic body detecting function for detecting a dynamic body contained in a moving image, a dynamic body region setting function for, during a predetermined time from a time point the dynamic body is detected by the dynamic body detecting function, setting a region containing the dynamic body at the detection time point as a dynamic body region, and a fluctuation removable processing function for performing a fluctuation removal process on an entire region of the moving image excluding the dynamic body region set by the dynamic body region setting function.

According to the embodiments of the present invention described above, even if part of the moving subject is not correctly recognized as a dynamic body, the image quality can be avoided from degrading due to the fluctuation removal process.

BRIEF DESCRIPTION OF THE DRAWINGS

FIG. 7 is an explanatory view showing an example of a hardware configuration of an information processing apparatus capable of realizing the image processing method according to the embodiment.

DETAILED DESCRIPTION OF THE EMBODIMENT

Figure 1:
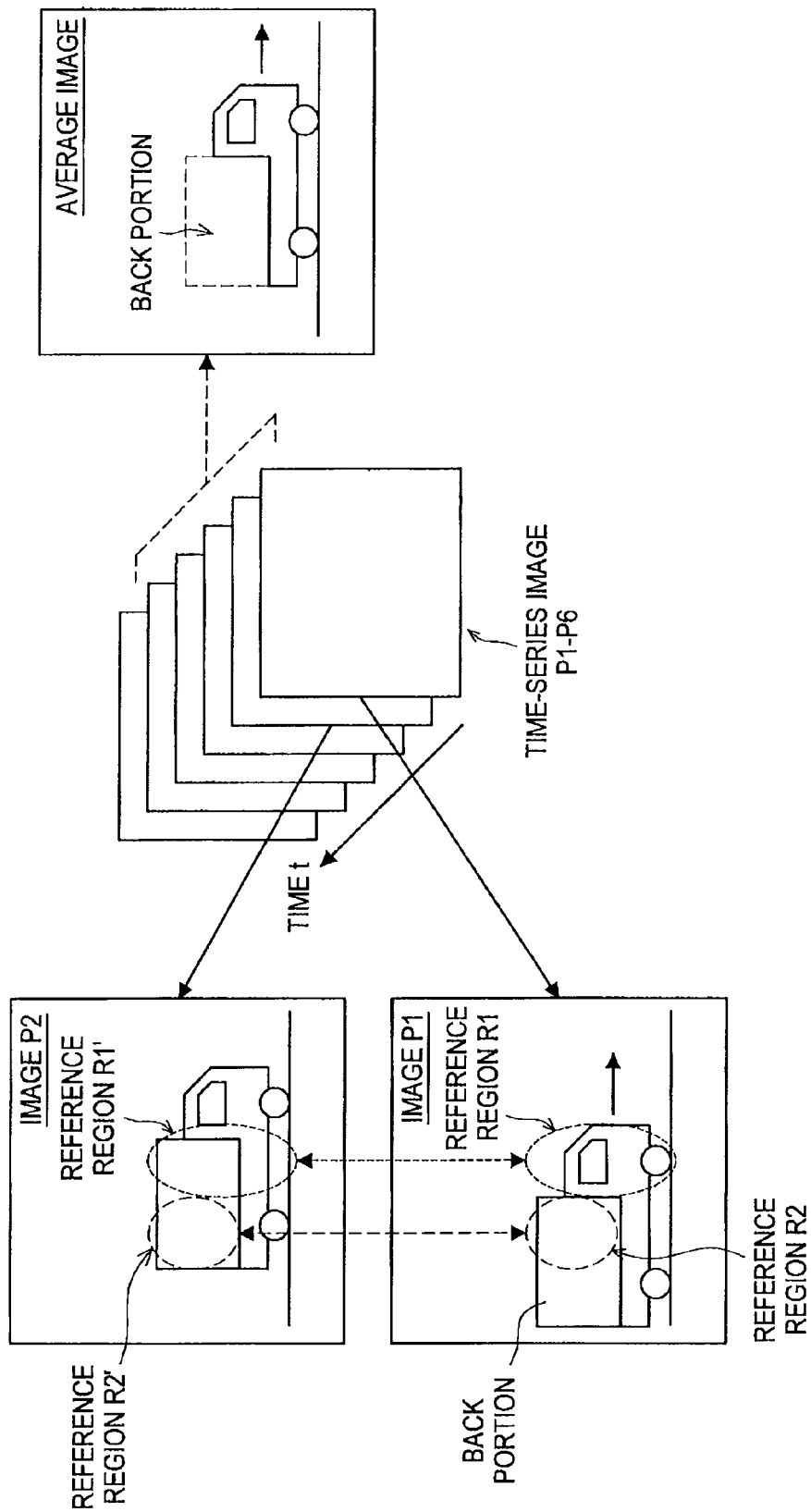
FIG. 1 is an explanatory view describing the influence that arises when a filtering process is performed on a moving subject.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

[Regarding Flow of Description]

The flow of description related to the embodiment of the present invention described below will be briefly described. First, with reference to FIG. 1, the issues that arise by performing the fluctuation removal process based on the averaging process, the median process and the like will be briefly described. A function configuration of an image processing apparatus 100 according to one embodiment of the present invention will then be described with reference to FIG. 2.

A super-resolution process, which is one example of a high resolution process according to the embodiment, will be schematically described with reference to FIG. 3. The flow of image processing according to the embodiment will be described with reference to FIGS. 4 and 5. A method of applying the image processing according to the embodiment to a block-divided region will be described with reference to FIG. 6. An example of a hardware configuration of an information processing apparatus capable of realizing the functions of the image processing apparatus 100 according to the embodiment will be briefly described with reference to FIG. 7. Lastly, the technical idea of the embodiment will be summarized, and the effects obtained from such technical idea will be briefly described.

(Describing Items)

1: Organization of issues (Regarding fluctuation removal process by filtering)

2: Embodiment 2-1: Regarding function configuration of image processing apparatus 100

2-2: Regarding non-rigid body registration processing technique 2-3: Regarding super-resolution processing technique 2-4: Regarding flow of image processing 2-5: Regarding method of reducing calculation load by block division 2-6: Regarding example of hardware configuration of image processing apparatus 100

2-7: Summary

<1: Organization of Issues>

First, prior to describing the technique according to one embodiment of the present invention in detail, the issues to be solved by the embodiment will be briefly described with reference to FIG. 1.

FIG. 1 shows a fluctuation removal method based on the averaging process. As already described earlier, the influence of fluctuation sometimes appear in the photographed image due to the influence of the fluctuation of air when imaging a moving image with a video camera or the like. Such influence of fluctuation can be removed by performing the filtering process such as the averaging process and the median process on the photographed image. However, if the filtering process is performed on the image region containing the moving subject (hereinafter referred to as dynamic body), a portion of the dynamic body may disappear, or the image quality may degrade (residual image etc.) at the relevant portion.

For instance, when a moving automobile is photographed, the position of the automobile changes every second in a plurality of photographed images (hereinafter referred to as time-series images) configuring the moving image. Thus, if the pixel values of the image region containing the automobile are averaged for the time-series images, an average value is calculated with respect to the pixel value of a background image recorded after the movement of the automobile, whereby the contour or the color of the automobile fades as a result. That is, the automobile disappears from the photographed image due to the averaging filtering process. Such phenomenon similarly occurs for the median process. A technique of performing the filtering process only on the image region not containing the dynamic body is thus developed.

This technique detects the dynamic body from the photographed image, and performs the filtering process on the image region other than the region in which the dynamic body is detected. However, if the dynamic body is not correctly detected, only the dynamic body portion that is not detected disappears, or the image quality degrades. Such failure in the dynamic body detection tends to occur in the image region containing the back portion of a truck etc. The back portion of the truck is often long in the moving direction and is a single color or a monotonous color. The dynamic body detecting process calculates the difference of the pixel value for every pixel or for every image region among a plurality of photographed images of the time-series images, and determines the same as the pixel or the image region containing the dynamic body if the difference value is greater than a predetermined threshold value.

Therefore, if the pixel value is not changed in the pixel or the image region of the photographed image to be subjected to the difference calculation, the pixel or the image region may not be determined as the dynamic body although it is actually the dynamic body. FIG. 1 shows the back portion of the truck by way of example. In FIG. 1, time-series images P1 to P6 and an average image after performed with the averaging filtering process are schematically shown. Photographed images P1, P2 included in the time-series images P1 to P6 are separately shown. The photographed image P1 is recorded earlier than the photographed image P2.

First, attention is to be made on the photographed images P1, P2. The dynamic body detecting process focuses on a certain pixel or an image region (hereinafter referred to as reference region) and determines whether or not a pixel value of the reference region differs by greater than or equal to a predetermined value among a plurality of photographed images, as described above. For example, reference regions R1, R1' shown in FIG. 1 are to be focused. The reference region R1 of the photographed image P1 corresponds to the reference region R1' of the photographed image P2. In the photographed image P1, the reference region R1 contains the driver seat portion of the truck. However, the reference region R1' of the photographed image P2 does not contain the driver seat portion of the truck as the truck is moving at the time point the photographed image P2 is recorded. Thus, a large difference creates between the pixel value of the reference region R1 and the pixel value of the reference region R1'. As a result, the subject contained in the reference regions R1, R1' is determined as the dynamic body.

Reference regions R2, R2' shown in FIG. 1 are then to be focused. The reference region R2 of the photographed image P1 corresponds to the reference region R2' of the photographed image P2. In the photographed image P1, the reference region R2 contains the back portion of the truck. The truck is moving at the time point photographed image P2 is recorded, as described above. However, the reference region R2' of the photographed image P2 still contains the back portion of the truck. As mentioned above, the back portion of the truck often has a monotonous color. Thus, a large difference does not create between the pixel value of the reference region R2 and the pixel value of the reference region R2' even if the portion that is actually different is photographed. As a result, the subject contained in the reference regions R2, R2' is determined as the non-dynamic body.

The average image shown in FIG. 1 will now be focused. The driver seat portion of the truck etc. is determined as the dynamic body, and the back portion is determined as the non-dynamic body. Thus, the back portion of the truck disappears from the average image if the averaging filtering process is performed on the non-dynamic body portion. Therefore, determination may not be made as the dynamic body in the dynamic body detecting process although it is actually the dynamic body. As a result, the relevant portion disappears after the filtering process or the image quality degrades, whereby the photographed image becomes unnatural and odd. In the embodiment to be hereinafter described, the fluctuation removal method in which, even if part of the dynamic body is determined as the non-dynamic body, the part of the dynamic body does not disappear or the image quality does not degrade is proposed.

<2: Embodiment>

One embodiment of the present invention will be described. The present embodiment assumes an image region (hereinafter referred to as dynamic body region) containing the dynamic body as the dynamic body region for a predetermined time when the dynamic body is detected, and prevents the fluctuation removal process from being performed on the relevant region even after the dynamic body has moved.

[2-1: Regarding Function Configuration of Image Processing Apparatus 100]

Figure 2:
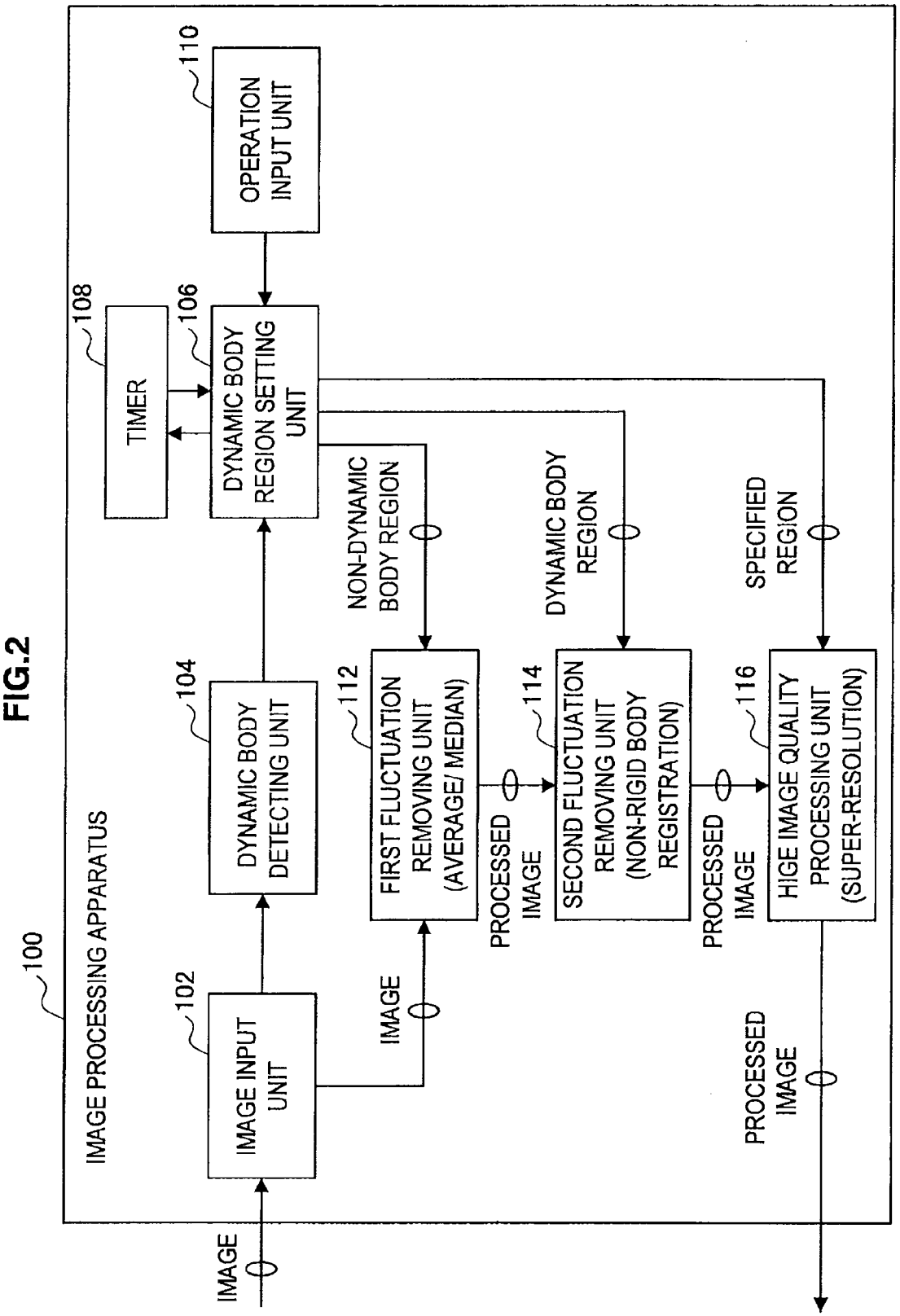
FIG. 2 is an explanatory view showing an example of a function configuration of an image processing apparatus according to one embodiment of the present invention.

First, the function configuration of the image processing apparatus 100 according to the present embodiment will be described with reference to FIG. 2. FIG. 2 is an explanatory view showing an example of the function configuration of the image processing apparatus 100 according to the present embodiment.

As shown in FIG. 2, the image processing apparatus 100 mainly includes an image input unit 102, a dynamic body detecting unit 104, a dynamic body region setting unit 106, a timer 108, an operation input unit 110, a first fluctuation removing unit 112, a second fluctuation removing unit 114, and a high image quality processing unit 116. The image processing apparatus 100 may also include an imaging unit (not shown) for imaging an image of a subject.

First, the image input unit 102 is input with a photographed image. If a moving image is input, the image input unit 102 is input with time-series images configured by a plurality of photographed images. The photographed image input to the image input unit 102 is input to the dynamic body detecting unit 104 and the first fluctuation removing unit 112. When the photographed image is input from the image input unit 102 to the dynamic body detecting unit 104, the dynamic body detecting unit 104 executes the dynamic body detecting process based on the input photographed image.

For instance, the dynamic body detecting unit 104 calculates a differential pixel value of the photographed image taken temporally before and after for each image region of the photographed image of the time-series images. The dynamic body detecting unit 104 also determines whether or not the calculated differential pixel value is greater than a predetermined threshold value, and determines the image region greater than the predetermined threshold value as the dynamic body. In the following description, the image region determined as the dynamic body by the dynamic body detecting unit 104 is sometimes referred to as the dynamic body region. Each image region may be set in units of pixels, or may be set in units of pixel blocks configured by a predetermined number of pixels. The number of photographed images referenced by the dynamic body detecting unit 104 for the dynamic body detection is not limited to two, and may be three or more. Moreover, the dynamic body detecting method of setting a sufficiently large number of photographed images to be referenced so that the subject that fluctuates at a constant period such as tree or wave is not detected as the dynamic body may be used in combination.

The information of the dynamic body region detected by the dynamic body detecting unit 104 is input to the dynamic body region setting unit 106. The dynamic body region detected by the dynamic body detecting unit 104 does not include a subject of monotonous color as illustrated by the back portion of the truck etc. Therefore, a new dynamic body region is to be set such that the dynamic body region includes the image region containing such subject. The dynamic body region setting unit 106 thus newly sets the dynamic body region and the non-dynamic body region based on the information of the dynamic body region input from the dynamic body detecting unit 104. The dynamic body region setting unit 106 does not newly detect part of the dynamic body not detected by the dynamic body detecting unit 104, and maintains the dynamic body region detected by the dynamic body detecting unit 104 as the dynamic body region for a predetermined time.

With reference to the example of FIG. 1, for example, the reference region R1 of the photographed image P1 is judged as the dynamic body region by the dynamic body detecting unit 104. The dynamic body region setting unit 106 assumes the image region corresponding to the reference region R1 as the dynamic body region for a predetermined time. As described above, the reference region R2 of the photographed image P1 is determined as the non-dynamic body region by the dynamic body detecting unit 104 as the difference with the reference region R2' of the photographed image P2 is small. However, the image region (reference region R1') corresponding to the reference region R1 is assumed as the dynamic body region for a predetermined time by the dynamic body region setting unit 106. That is, the front side of the back portion of the truck corresponding to the reference region R1' is set as the dynamic body region. For instance, the entire back portion of the truck is set as the dynamic body region by setting the time for the entire back portion of the truck to pass through the image region corresponding to the reference region R1 as the predetermined time.

The predetermined time is appropriately set according to the subject to be photographed etc. The predetermined time is set by the timer 108. The timer 108 starts counting of time in response to an instruction to start counting received from the dynamic body region setting unit 106, and notifies the dynamic body region setting unit 106 that a predetermined time has elapsed at the time point the predetermined time has elapsed. The dynamic body region setting unit 106 uses the timer 108 to set the image region corresponding to the dynamic body region as the dynamic body region in the photographed image until the time point the predetermined time has elapsed with the photographed image containing the dynamic body region detected by the dynamic body detecting unit 104 as a reference. That is, the image region corresponding to the dynamic body region of the photographed image that becomes a reference is set as the dynamic body region of the photographed image in the time-series images photographed within a predetermined time after such photographed image. The image region not set as the dynamic body region by the dynamic body region setting unit 106 is set as the non-dynamic body region.

The information of the non-dynamic body region set by the dynamic body region setting unit 106 is input to the first fluctuation removing unit 112. The information of the dynamic body region set by the dynamic body region setting unit 106 is input to the second fluctuation removing unit 114. Furthermore, if the image region is specified using the operation input unit 110, the dynamic body region setting unit 106 sets the relevant image region as a specified region, and inputs the information of the specified region to the high image quality processing unit 116. The specified region will be hereinafter described.

As described above, the first fluctuation removing unit 112 is input with the photographed image input to the image input unit 102, and the information of the non-dynamic body region set by the dynamic body region setting unit 106. The first fluctuation removing unit 112 performs a fluctuation removal process on the non-dynamic body region of the photographed image input from the image input unit 102 based on the information of the non-dynamic body region input from the dynamic body region setting unit 106. The fluctuation removal process performed on the photographed image by the first fluctuation removing unit 112 is, for example, a filtering process (hereinafter referred to as first fluctuation removal process) such as the averaging process and the median process. As described earlier, if the non-dynamic body region determined in the dynamic body detecting process contains the dynamic body, the first fluctuation removal process is performed on such dynamic body, whereby the dynamic body may disappear from the output image or the image of the dynamic body portion may degrade.

In the present embodiment, however, part of the dynamic body, which is actually a dynamic body but is not detected in the dynamic body detecting process, is excluded from the non-dynamic body region by the process of the dynamic body region setting unit 106. Thus, the first fluctuation removal process will not be performed on the part of the dynamic body in the non-dynamic body region determined in the dynamic body detecting process of the dynamic body detecting unit 104, and part of the dynamic body does not disappear from the output image. It can be recognized that the part of the dynamic body that is not excluded from the non-dynamic body region in the process of the dynamic body region setting unit 106 sometimes disappears from the output image of the first fluctuation removal process or the image sometimes degrades. In most cases, however, sufficient effects are achieved by the technique of the present embodiment.

The photographed image (hereinafter referred to as first processed image) performed with the first fluctuation removal process by the first fluctuation removing unit 112 is input to the second fluctuation removing unit 114. The second fluctuation removing unit 115 is also input with the information of the dynamic body region from the dynamic body region setting unit 106. As described above, the first processed image is only performed with the first fluctuation removal process on the non-dynamic body region. Thus, a fluctuation removal process (hereinafter referred to as second fluctuation removal process), with which the dynamic body does not disappear or the image does not degrade in the dynamic body region, is performed on the dynamic body region of the first processed image by the second fluctuation removing unit 114. An image processing technique called a non-rigid body registration is used for the second fluctuation removal process. The non-rigid body registration processing technique will be hereinafter described. The second fluctuation removing unit 114 may be configured to perform the second fluctuation removal process on the dynamic body region specified through the operation input unit 110.

The photographed image (hereinafter referred to as second processed image) performed with the second fluctuation removal process by the second fluctuation removing unit 114 is input to the high image quality processing unit 116. The first processed image or the second processed image may be displayed on a display screen (not shown) after the fluctuation removal process is performed by the first fluctuation removing unit 112 or the second fluctuation removing unit 114. According to such configuration, the user can operate the operation input unit 110 and specify the specifying region while referencing the first processed image or the second processed image displayed on the display screen. The high image quality processing unit 116 performs a high image quality processing on the specified region specified through the operation input unit 110 of the image regions in the second processed image.

A very high calculation processing ability is normally desired to realize high image quality processing. Thus, the image processing apparatus 100 is configured to perform high image quality processing only on the specified region instead of performing the high image quality processing on the entire image region in the photographed image. It can be recognized that the high image quality process may be performed on the entire image region of the photographed image if the image processing apparatus 100 is realized by hardware having a sufficiently high calculation processing ability. A super-resolution processing technique, and the like are used for the high image quality processing. The super-resolution technique will be hereinafter described. The photographed image (hereinafter referred to as processed image) performed with the high image quality processing by the high image quality processing unit 116 is then output to the outside of the image processing apparatus 100.

The function configuration of the image processing apparatus 100 according to the present embodiment has been described above. The configuration described herein is an example, and a variant in which the second fluctuation removing unit 114 and the high image quality processing unit 116 are omitted may be adopted. If the second fluctuation removing unit 114 is omitted, the first processed image output from the first fluctuation removing unit 112 is input to the high image quality processing unit 116. If the high image quality processing unit 116 is omitted, the operation input unit 110 is also omitted, and the second processed image output from the second fluctuation removing unit 114 is output as the processed image. Furthermore, if the second fluctuation removing unit 114 and the high image quality processing unit 116 are omitted, the first processed image output from the first fluctuation removing unit 112 is output to the outside as the processed image.

The flow of image processing related to the first fluctuation removal process may be modified as below. In the description of FIG. 2, a flow in which the dynamic body region and the non-dynamic body region are set in advance by the dynamic body region setting unit 106, and the first fluctuation removal process is performed by the first fluctuation removing unit 112 based on the set content is shown. However, the first fluctuation removal process may be performed in advance by the first fluctuation removing unit 112 on the non-dynamic body region detected by the dynamic body detecting unit 104, and the pixel value of the first processed image and the pixel value of the original image may be appropriately selected by the dynamic body region setting unit 106 to generate the output image (processed image).

In this case, the first fluctuation removing unit 112 performs the first fluctuation removal process on the dynamic body region detected by the dynamic body detecting unit 104 and not on the dynamic body region reset by the dynamic body region setting unit 106. The dynamic body region setting unit 106 not only resets the dynamic body region and the non-dynamic body region using the timer 108, but also generates the processed image with the pixel of the first processed image corresponding to the reset non-dynamic body region and the original image corresponding to the reset dynamic body region. Therefore, when performing such modification, the information of the non-dynamic body region detected by the dynamic body detecting unit 104 is input to the first fluctuation removing unit 112. The dynamic body region setting unit 106 is input with the first processed image based on the detection result of the dynamic body detecting unit 104 output from the first fluctuation removing unit 112, and the original image input to the image input unit 102. The first processed image generated by the dynamic body region setting unit 106 is input to the second fluctuation removing unit 114. In such modification, the functions of the second fluctuation removing unit 114 and the high image quality processing unit 116 are not modified.

As described above, the configuration of the image processing apparatus 100 can be appropriately changed while maintaining the technical features of the present embodiment. The technical features of the present embodiment lie in that the dynamic body region is reset as described above for all the frames included from the frame (photographed image) in which the dynamic body is detected by the dynamic body detecting unit 104 to the frame of after elapse of a predetermined time. Through such resetting, the disappearance of the dynamic body from the processed image and the degradation of the image at the dynamic body portion due to the fluctuation removal process can be prevented.

[2-2: Regarding Non-rigid Body Registration Processing Technique]

The non-rigid body registration process executed by the second fluctuation removing unit 114 will be briefly described.

First, the registration used in the field of image processing often refers to a method of estimating a conversion parameter the images match when two images are overlapped. The method of estimating the conversion parameter assuming the photographing object is a non-rigid body is sometimes particularly referred to as a non-rigid body registration. In the non-rigid body registration process, the control point that partitions the image space at a predetermined interval is set as a parameter, and the position of the control point where a predetermined registration evaluation function becomes a maximum is determined while changing the parameter. Furthermore, a deformation vector field of the image space is estimated based on the determined position of the control point.

A function containing the evaluation component for evaluating the similarity of the images to compare is used for the registration evaluation function. The similarity evaluated by the registration evaluation function includes an entropy correlation coefficient, Pearson's product-moment correlation coefficient, and the like. The similarity is calculated based on the simultaneous distribution of multi-dimensional vector configured by the control point of each image to compare. The deformation vector field of the image space is expressed by N-1 Bezier curves defined by N control points.

Therefore, the non-rigid body registration refers to the method of estimating the deformation vector field of the image space as a deformation parameter. The above description is obviously schematic, and the non-rigid body registration processing technique including numerous developmental deformations is actually developed. It can be recognized that various non-rigid body registration processing techniques including such developmental deformation can be used in the second fluctuation removing unit 114 of the present embodiment.

[2-3: Regarding Super-resolution Processing Technique]

The super-resolution process, which is an example of the high image quality processing according to the present embodiment, will be briefly described with reference to FIG. 3. FIG. 3 is an explanatory view schematically showing the content of the super-resolution process.

Figure 3:
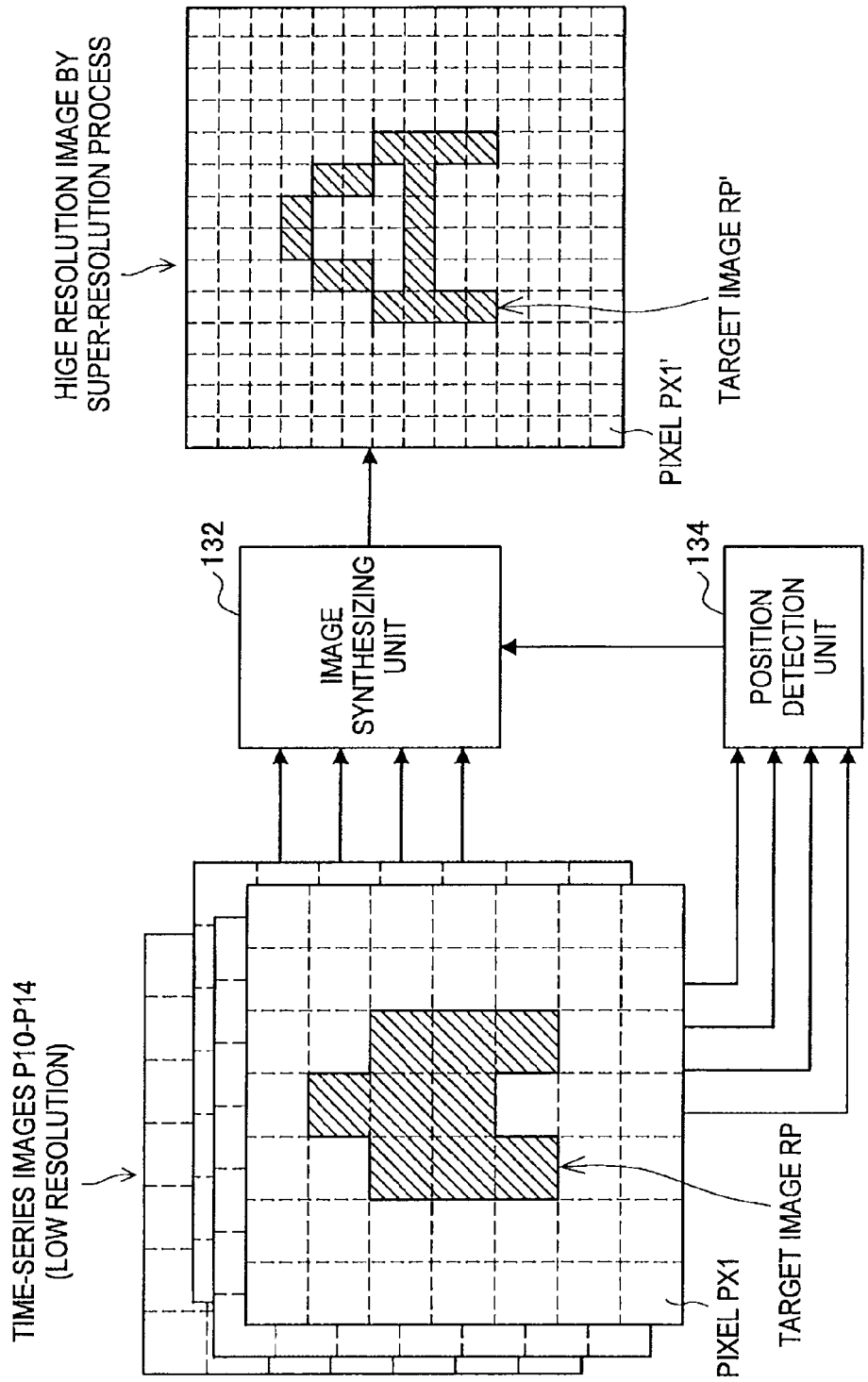
FIG. 3 is an explanatory view showing one example of a high resolution processing method according to the embodiment.

As shown in FIG. 3, the super-resolution processing technique calculates a high resolution image of relatively high resolution using the time-series images (e.g., P10 to P14) of relatively low resolution. That is, the super-resolution process is a process of interpolating the high frequency component using a plurality of low resolution images not containing the high frequency component, and reconfiguring the high resolution image containing the high frequency component. For instance, two images are photographed with the position shifted by ½ pixel with the imaging sensor of the same resolution as the low resolution image, and the pixel values extracted from such images are alternately combined one pixel at a time for synthesis. The high frequency component can be restored by performing such process. Instead of movement controlling the position of the imaging sensor, the high frequency component can be restored using the position shift of smaller than one pixel caused by instability etc. in time of photographing.

The super-resolution process is roughly divided to a position detecting process for detecting the relative position shift between the low resolution images of the time-series images, and an image synthesizing process of synthesizing the low resolution images in view of the position shift. In the example of FIG. 3, the component corresponding to the position detecting process is noted as a position detecting unit 134, and the component corresponding to the image synthesizing process is noted as an image synthesizing unit 132. In the position detecting unit 134, the amount of shift of the sampled position between each low resolution image in the time-series images is detected at an accuracy of smaller than or equal to the pixel. The amount of shift of the sampled position detected by the position detecting unit 134 is then input to the image synthesizing unit 132. The image synthesizing unit 132 combines and synthesizes the pixel values of the sampled position corresponding to each other based on the amount of shift of the sampled position detected by the position detecting unit 134 to calculate the pixel value of the reconfigured image (high resolution image).

In the example of FIG. 3, a target image RP of low resolution formed with pixels PX1 is reconfigured to a target image RP' of high resolution formed with pixels PX1' by executing the super-resolution process. The super-resolution process is a process of a very high calculation load. Thus, the process may not finish within a realistic time depending on the number of low resolution images to be referenced in the reconfiguration process or the number of low resolution images to be processed, or the size of the image region to be subjected to the super-resolution process. Thus, the image processing apparatus 100 according to the present embodiment is configured to perform the super-resolution process only on the image region specified through the operation input unit 110.

The super-resolution processing technique has been schematically described above. With respect to such super-resolution processing technique, various researches and developments are being made to efficiently and accurately execute the process corresponding to the position detecting unit 134 and the process corresponding to the image synthesizing unit 132. An arbitrary technique achieved through such researches and developments can be used in combination with the technique of the present embodiment.

[2-4: Regarding Flow of Image Processing]

Figure 4:
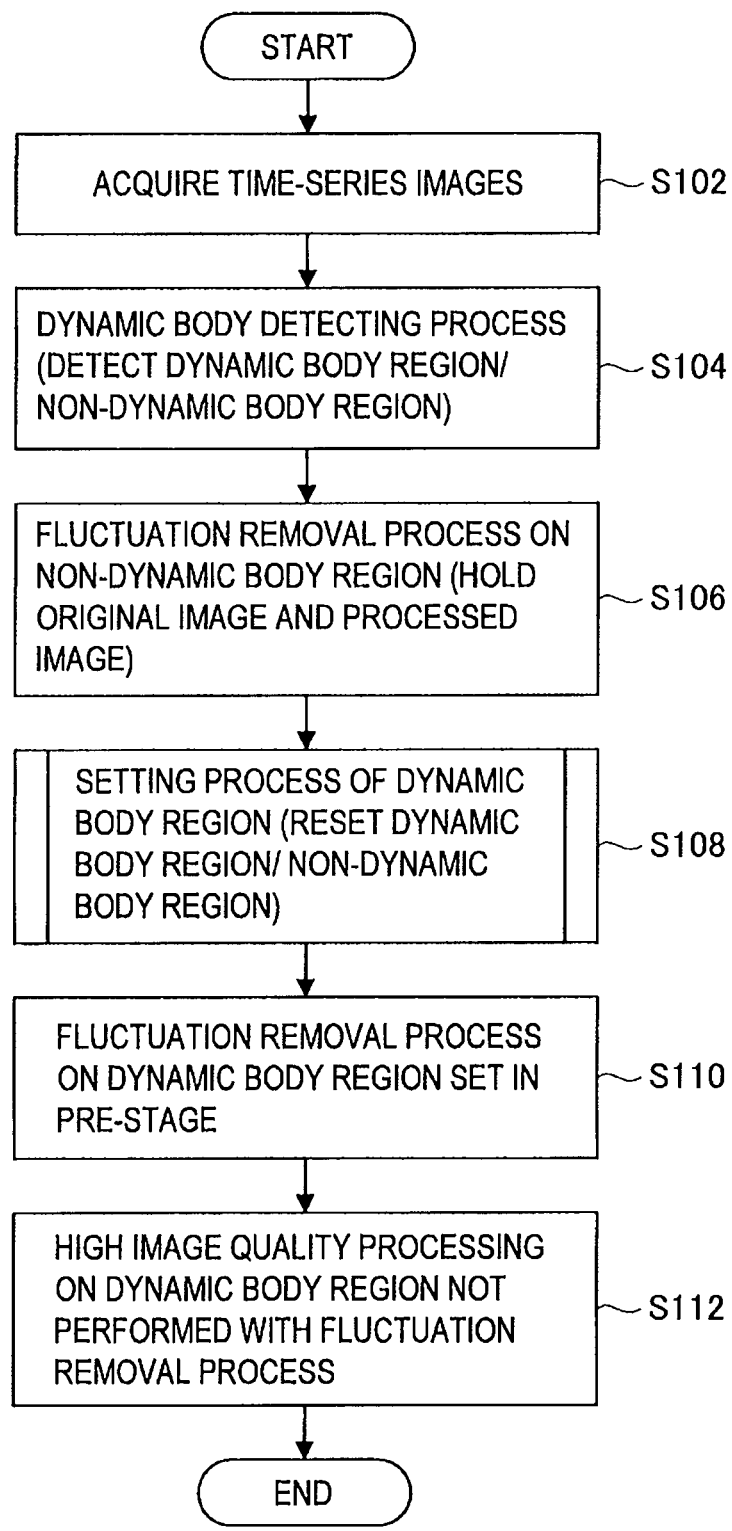
FIG. 4 is an explanatory view showing an overall flow of image processing according to the present embodiment.
Figure 5:
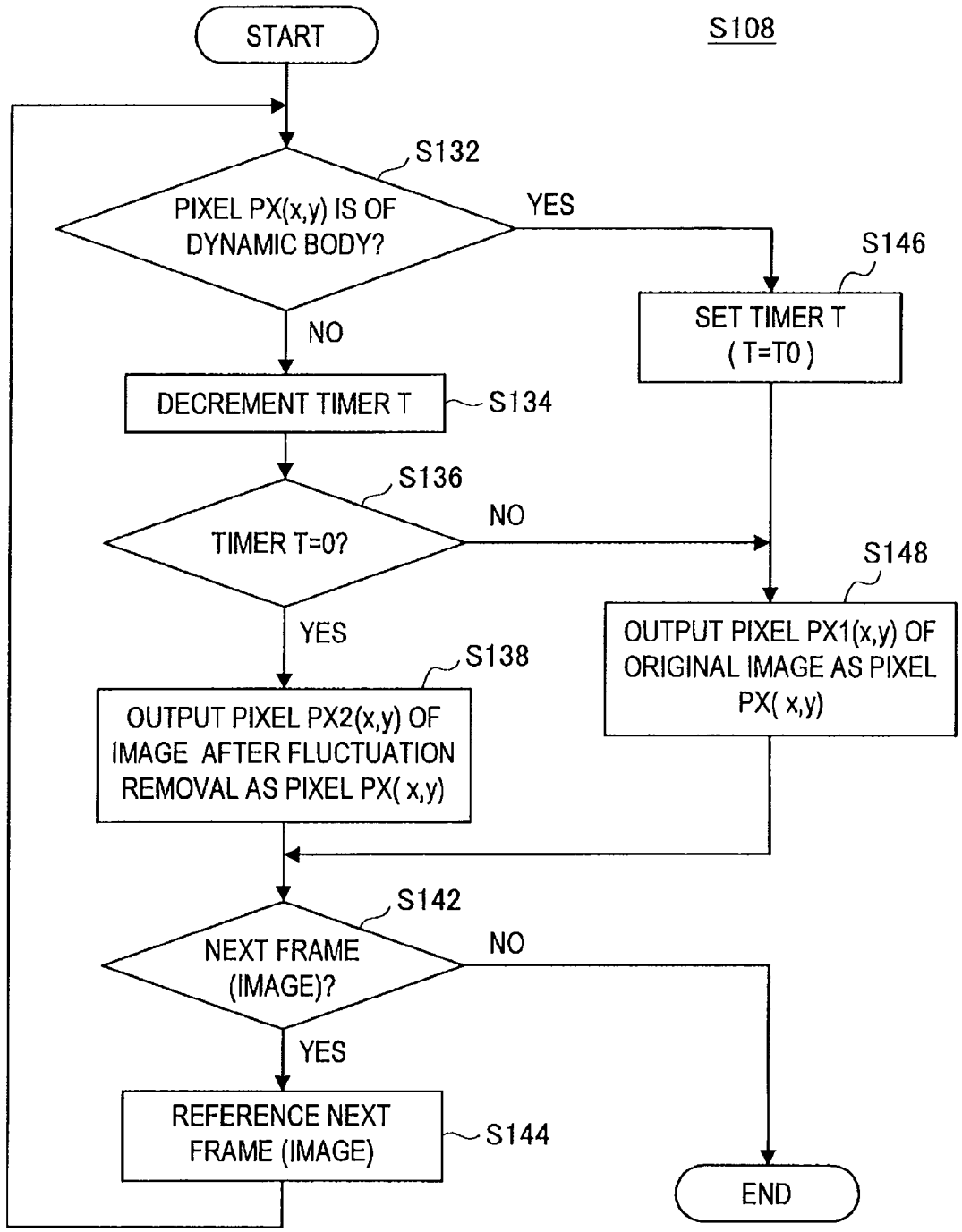
FIG. 5 is an explanatory view showing a flow of image processing according to the present embodiment.

The flow of image processing according to the present embodiment will now be described with reference to FIGS. 4 and 5. FIG. 4 is an explanatory view showing an overall flow of image processing according to the present embodiment. FIG. 5 is an explanatory view showing a flow related to a setting process of a dynamic body region in the overall flow shown in FIG. 4.

The image processing described here is realized using the image processing apparatus 100 shown in FIG. 2. In the image processing method shown in FIGS. 4 and 5, the fluctuation removal process is executed through a procedure slightly different from the flow of image processing in the image processing apparatus 100 shown in FIG. 2. More specifically, the difference lies in that in the relevant image processing, the first and second fluctuation removal processes are performed in advance on the dynamic body region and the non-dynamic body region detected by the dynamic body detecting unit 104, and the first and second processed images obtained by such processes are reconfigured in the dynamic body region setting unit 106. The similarity lies in that the image region set as the dynamic body region in the dynamic body detecting unit 104 is assumed as the dynamic body region for a predetermined time, and the first fluctuation removal process is not performed on the subject set in the non-dynamic body region in the dynamic body detecting unit 104 although it is actually a dynamic body. Therefore, the image processing method shown in FIGS. 4 and 5 and the image processing method described in the description of FIG. 2 are embodiments that can be realized based on the same technical idea.

First, FIG. 4 will be referenced. As shown in FIG. 4, the image input unit 102 acquires the time-series images (S102). The dynamic body detecting unit 104 executes the dynamic body detecting process (S104). In this case, the difference in pixel value is calculated among a plurality of photographed images in the time-series images, and the dynamic body region and the non-dynamic body region are detected based on the calculation result in the dynamic body detecting unit 104. The first fluctuation removing unit 112 performs the first fluctuation removal process on the non-dynamic body region detected by the dynamic body detecting unit 104 (S106). In this case, the original image of the time-series images acquired by the image input unit 102 and the first processed image of after the first fluctuation removal process is performed are held in the image processing apparatus 100. The dynamic body region setting unit 106 resets the dynamic body region and the non-dynamic body region (S108). The process executed in step S108 will be hereinafter described with reference to FIG. 5.

The second fluctuation removing unit 114 performs the second fluctuation removal process on the dynamic body region reset in step S108 (S110). Step S110 may be such that the second fluctuation removal process is performed on all dynamic body regions, or may be such that the second fluctuation removal process is performed only on the specified region specified through the operation input unit 110. The process such as non-rigid body registration is a process of relatively large calculation amount. Thus, the calculation load is reduced by limiting the processing target to the specified region. If the dynamic body region not performed with the second fluctuation process exists, the high image quality processing unit 116 performs the high image quality processing on such dynamic body region (S112). Regarding the dynamic body region performed with the high image quality processing as well, the processing target is preferably limited to a specified region from the standpoint of reducing the calculation load.

The resetting method of the dynamic body region and the non-dynamic body region corresponding to step S108 will now be described with reference to FIG. 5. The process of step S108 is mainly realized using the dynamic body region setting unit 106. The flow of processes shown in FIG. 5 is executed on all the pixels contained in the photographed image.

As shown in FIG. 5, whether or not the pixel PX(x,y) is of the dynamic body is first determined (S132). The pixel PX(x, y) indicates an arbitrary pixel contained in the photographed image. Furthermore, (x,y) represents a coordinate position where the pixel PX(x,y) is arranged. The determination process in step S132 is executed based on the information of the dynamic body region and the non-dynamic body region determined by the dynamic body detecting unit 104. If the dynamic body region includes the pixel PX(x,y), the dynamic body region setting unit 106 proceeds to the process of step S146. If the non-dynamic body region includes the pixel PX(x,y), the dynamic body region setting unit 106 proceeds to the process of step S134.

In step S134, a time T of the timer 108 is decremented (S132). If time T of the timer 108 is T=0, the time T=0 is maintained. The dynamic body region setting unit 106 then determines whether or not the time T of the timer 108 is zero (S136). If the time T of the timer 108 is T≠0, the dynamic body region setting unit 106 proceeds to the process of step S148. If the time T of the timer 108 is T=0, the dynamic body region setting unit 106 proceeds to the process of step S138. In step S138, the dynamic body region setting unit 106 outputs a pixel PX2($x,y$) of the first processed image as the pixel PX(x,y) (S138).

The dynamic body region setting unit 106 then determines whether or not a next frame (photographed image) exists in the time-series images (S142). If the next frame exists, the dynamic body region setting unit 106 proceeds to the process of step S144. If the next frame does not exist, the dynamic body region setting unit 106 terminates the series of processes. In step S144, the dynamic body region setting unit 106 references a photographed image corresponding to the next frame (S144). The dynamic body region setting unit 106 again executes the series of processes starting from step S132 on the photographed image of the frame to reference.

If the process proceeds to the process of step S146 based on the determination process of step S132, the dynamic body region setting unit 106 sets the time T of the timer 108 to a predetermined time T0 in step S146 (S146). In step S148, the dynamic body region setting unit 106 outputs the pixel PX1 ($x,y$) of the original image not performed with the first fluctuation removal process as the pixel PX(x,y) (S148). After step S148, the dynamic body region setting unit 106 proceeds to the process of step S142.

The above flow can be summarized as below. First, whether each pixel PX is of the dynamic body or of the non-dynamic body is determined in step S132 based on the information of the dynamic body region and the non-dynamic body region detected by the dynamic body detecting unit 104. The timer T of the timer 108 is set to a predetermined time T0 if the pixel PX is of the dynamic body. If the pixel PX is not of the dynamic body, the time T of the timer 108 is decremented. That is, the dynamic body region setting unit 106 counts the predetermined time T0 by decrementing the time T of the timer 108 with the time point the pixel PX is determined as being of the dynamic body as a reference.

As described above, the dynamic body region setting unit 106 assumes the image region as the dynamic body region for the predetermined time T0 from when the dynamic body is detected. That is, the pixel PX determined as being of the dynamic body in a certain frame is assumed as the pixel PX of the dynamic body in all the frames from the relevant frame to the frame of after the predetermined time T0. In order to realize such assumption process, the pixel PX1 of the original image is output as the pixel PX until time T=0 after the time T of the timer 108 is set in the image processing method.

In other words, whether or not time T=0 is determined in step S136, and the pixel PX1 is output in the process of step S148 if not time T=0. If the time T of the timer 108 becomes zero, the pixel PX2 of the first processed image is output in step S138. In the image processing method shown in FIG. 5, the resetting of the dynamic body region and the non-dynamic body region is carried out by switching the image to output for every pixel using the first processed image obtained by performing the first fluctuation removal process on the non-dynamic body region in advance and the original image.

The flow of image processing according to the present embodiment has been described above. In the present embodiment, the non-dynamic body region is reset as the dynamic body region for a predetermined time after the dynamic body is detected, and adjustment is made such that the first fluctuation removal process is not performed on the reset dynamic body region. As a result of such adjustment process, the first fluctuation removal process can be avoided from being performed on the image region that is actually a dynamic body but tends to be detected as the non-dynamic body region, whereby the disappearance of the dynamic body and the degradation of the image caused by the fluctuation removal process can be prevented. The image processing method described in the description of FIG. 2 includes resetting the dynamic body region and the non-dynamic body region, and performing the first fluctuation removal process based on the reset information. Both methods include a technical feature common to the present embodiment of resetting the non-dynamic body region as the dynamic body region for a predetermined time after the dynamic body is detected, whereby a significant effect in that the disappearance of the dynamic body and the degradation of the image caused by the fluctuation removal process are prevented can be obtained.

[2-5: Regarding Method of Reducing Calculation Load by Block Division]

Figure 6:
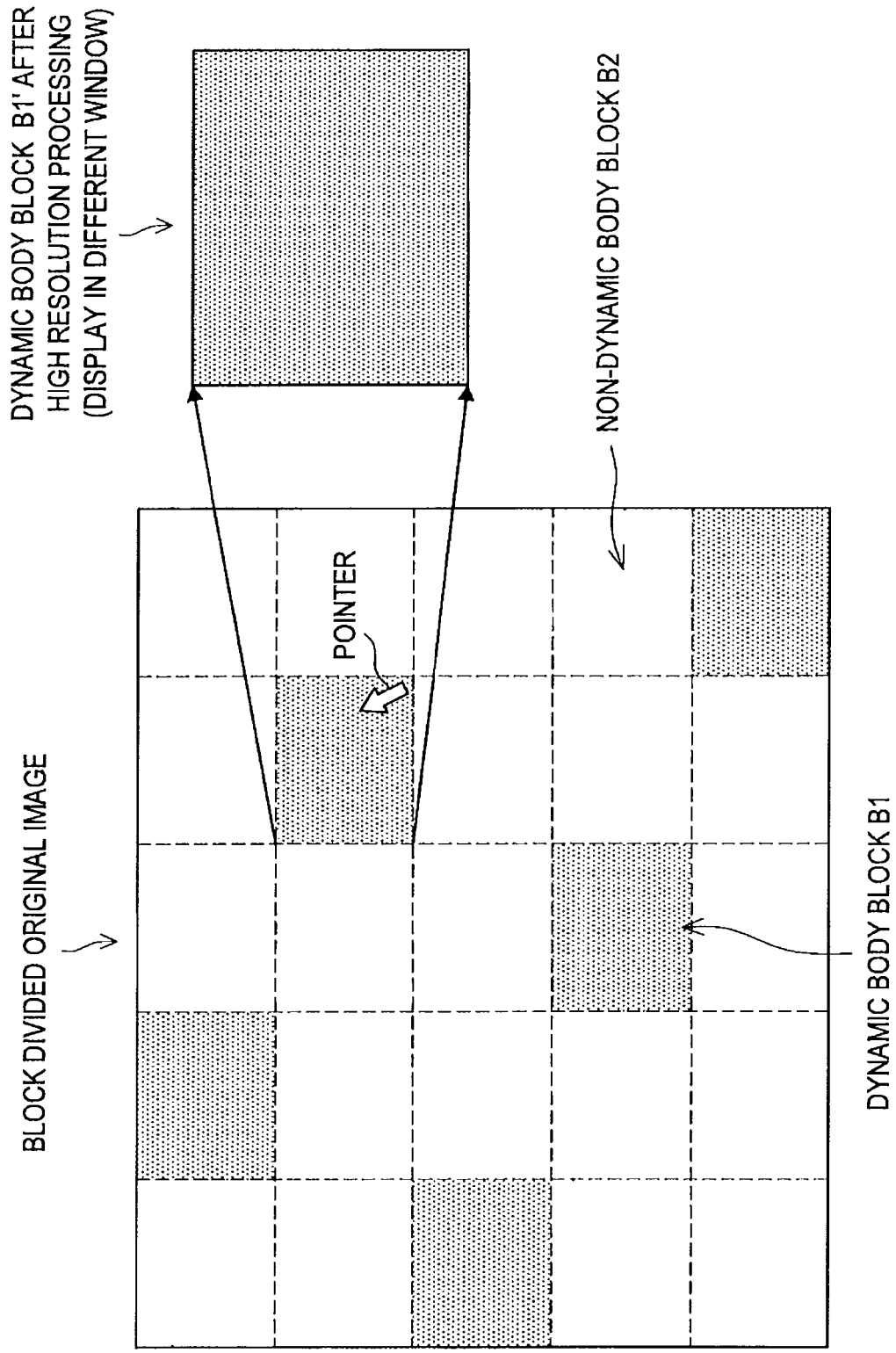
FIG. 6 is an explanatory view showing an example of an image processing method according to the embodiment.

The method of reducing the calculation load by block dividing the photographed image (hereinafter referred to as block division method) will now be described with reference to FIG. 6. FIG. 6 is an explanatory view showing the method of reducing the calculation load by block dividing the photographed image. As described earlier, the second fluctuation removal process and the high image quality process are processes having high calculation load compared to the first fluctuation removal process. Thus, in the present embodiment, such processes are allowed to be modified so as to be performed limited to the specified region. The block division method shown in FIG. 6 divides the photographed image to blocks of a predetermined size, and enables the block to be specified as a specified region.

For instance, as shown in FIG. 6, the photographed image is divided into 25 blocks. The user is presented with the photographed image, the first processed image, or the second processed image (hereinafter referred to as display image) through the display screen. The boundary of the blocks may be clearly shown or may not be clearly shown in the display image. A dynamic body block B1 including the dynamic body region and a non-dynamic body block B2 not including the dynamic body region may be clearly shown in the display image with color, pattern, or the like. The user specifies the block to perform the second fluctuation removal process or the high quality process through the operation input unit 110 while referencing the display image.

When the block is specified, the second fluctuation removal process or the high image quality process is performed on the dynamic body region in the relevant block by the second fluctuation removing unit 114 or the high image quality processing unit 116. The dynamic body block B1 performed with the second fluctuation removal process or the high image quality process may be displayed in a different window. The calculation load of the image processing apparatus 100 thus can be reduced by being configured such that the second fluctuation removal process or the high image quality process is performed on the specified block. As a result, the function of the image processing apparatus 100 can be realized without using an information processing apparatus mounted with an expensive and high performance calculation processing apparatus.

[2-6: Regarding Example of Hardware Configuration of Image Processing Apparatus 100]

The function of each component of the image processing apparatus 100 can be realized using the hardware configuration of the information processing apparatus shown in FIG. 7. For instance, the function of each component is realized by controlling the information processing apparatus shown in FIG. 7 using a computer program. The mode of the information processing apparatus shown here is arbitrary, and may be a personal computer, portable telephone, portable information terminal such as PHS, PDA, video games, imaging device, or various information home electronics. PHS is an abbreviation for Personal Hand-phone System. PDA is an abbreviation for Personal Digital Assistant.

As shown in FIG. 7, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements based on various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (socalled remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

[2-7: Summary]

Lastly, the function configuration of the image processing apparatus of the present embodiment and the effects obtained from the function configuration will be briefly summarized.

First, the function configuration of the image processing apparatus according to the present embodiment can be expressed in the following manner. The image processing apparatus includes a dynamic body detecting unit, a dynamic body region setting unit, and a fluctuation removal processing unit. The dynamic body detecting unit detects a dynamic body contained in the moving image. The dynamic body detecting unit compares the pixel values of a plurality of frames configuring the moving image, and when the amount of difference of the pixel value is greater than or equal to a predetermined amount, determines the image region corresponding to the relevant pixel value as the region of the dynamic body. That is, the dynamic body region is detected by the dynamic body detecting process.

During a predetermined time from the time point the dynamic body is detected by the dynamic body detecting unit, the dynamic body region setting unit sets the region containing the dynamic body at the relevant detection time point as the dynamic body region. That is, with respect to the image region corresponding to the dynamic body region detected in the dynamic body detecting process by the dynamic body detecting unit, the image region is reset as the dynamic body region even if such image region becomes the non-dynamic body region after the dynamic body has moved. As a result, even if the portion that is less likely to be detected as the dynamic body through the dynamic body detecting process by the dynamic body detecting unit is contained in one part of the dynamic body, such one part of the dynamic body can be avoided from being set as the non-dynamic body region.

The fluctuation removal processing unit performs the fluctuation removal process on the region other than the dynamic body region set by the dynamic body region setting unit. The fluctuation removal process performed by the fluctuation removal processing unit corresponds to the first fluctuation removal process. It can be recognized that the fluctuation removal process performed by the fluctuation removal processing unit may be the fluctuation removal process other than the first fluctuation removal process. If the fluctuation removal process performed by the fluctuation removal processing unit is the first fluctuation removal process, the dynamic body disappears or the image degrades if the relevant fluctuation removal process is performed on the image region containing the dynamic body.

However, the fluctuation removal processing unit performs the fluctuation removal process on the image region other than the dynamic body region set by the dynamic body region setting unit. Thus, one part of the dynamic body that is actually the dynamic body but is less likely to be detected as the dynamic body in the process of the dynamic body detecting unit is masked so that the fluctuation removal process is not performed thereon. As a result, disappearance of part of the dynamic body or degradation of the image due to the fluctuation removal process is avoided, and a satisfactory processed image is obtained.

The fluctuation removal processing unit may be configured to perform other fluctuation removal process, in which the video of the dynamic body contained in the dynamic body region does not disappear, on part of or the entire dynamic body region set by the dynamic body region setting unit. According to such configuration, (other) fluctuation removal process is performed on the image region that is actually a non-dynamic body region but is assumed as the dynamic body region by the masking process of the dynamic body region setting unit and thus not performed with the fluctuation removal process. As a result, the image quality of the processed image can be more significantly enhanced.

The image processing apparatus may also include a super-resolution processing unit for performing the super-resolution process on part of or the entire dynamic body region not performed with the other fluctuation removal process by the fluctuation removal processing unit of the dynamic body region set by the dynamic body region setting unit. As described above, the other fluctuation removal process may not be executed on all the dynamic body regions. For instance, the other fluctuation removal process may be performed only on the image region that is set as the dynamic body region by the dynamic body region setting unit but actually does not include the dynamic body, and the super-resolution process may be performed on the dynamic body region that actually contains the dynamic body.

As described above, the dynamic body region setting unit sets the image region corresponding to the dynamic body region detected in the first frame as the dynamic body region regardless of the presence of the dynamic body with respect to all the frames from the frame at the time point the dynamic body is detected to the frame of after elapse of a predetermined time. The optimum process is sometimes preferably divided for the dynamic body region containing the dynamic body and the dynamic body region not containing the dynamic body in the dynamic body regions. In particular, a processed image of a more natural image quality is obtained by enabling the user to specify the dynamic body region to be performed with the other fluctuation removal process and the dynamic body region to be performed with the super-resolution process. From the standpoint of calculation load, the calculation load can be effectively dispersed by appropriately changing the processing content instead of performing the same process on all the dynamic body regions.

The fluctuation removal process performed on all regions of the moving image excluding the dynamic body region by the fluctuation removal processing unit is the averaging process or the median process of the pixel value contained in each frame of the moving image. The fluctuation removal process performed on the dynamic body region is a fluctuation removal process based on the non-rigid body registration, and the like.

As described above, the dynamic body disappears or the image quality degrades if the averaging process or the median process is performed on the dynamic body region. According to the fluctuation removal process based on the non-rigid body registration, the dynamic body does not disappear and the image quality does not degrade. However, the calculation amount of the non-rigid body registration process is very large compared to the averaging process or the median process. Thus, the processing target of the filtering process such as the averaging process or the median process, and the process such as the non-rigid body registration is to be appropriately divided.

In the image processing apparatus described above, the dynamic body region and the non-dynamic body region are set by the dynamic body detecting unit and the dynamic body region setting unit, and the fluctuation removal process is divided for each region. In such case, the averaging process or the median process, and the non-rigid body registration process can be assigned in the above manner, so that the image quality of the moving image can be effectively enhanced while suppressing the increase of the calculation load.

The image processing method by the image processing apparatus includes a dynamic body detecting step, a dynamic body region setting step, and a fluctuation removal processing step. In the dynamic body detecting step, the dynamic body contained in the moving image is detected. In the dynamic body region setting step, during a predetermined time from the time point when the dynamic body is detected in the dynamic body detecting step, the region containing the dynamic body at the relevant detection time point is set as the dynamic body region. In the fluctuation removal processing step, the fluctuation removal process is performed on the entire region of the moving image excluding the dynamic body region set in the dynamic body region setting step. When each frame contained in the moving image is processed in the processing steps in such manner, the disappearance of the dynamic body or the degradation of the image quality of the dynamic body portion due to the fluctuation removal process can be avoided.

The image processing method is realized by using a program for causing a computer to realize a dynamic body detecting function, a dynamic body region setting function, and a fluctuation removal processing function. In the dynamic body detecting function, the dynamic body contained in the moving image is detected. The dynamic body region setting function sets, during a predetermined time from the time point when the dynamic body is detected by the dynamic body detecting function, the region that contained the dynamic body at the relevant detection time point as the dynamic body region. The fluctuation removal processing function is a function of performing the fluctuation removal process on the entire region of the moving image excluding the dynamic body region set by the dynamic body region setting function. When each frame contained in the moving image is processed using the program having such functions, the disappearance of the dynamic body or the degradation of the image quality of the dynamic body portion due to the fluctuation removal process can be avoided.

(Remark)

The first fluctuation removing unit 112 and the second fluctuation removing unit 114 serve as the fluctuation removal processing unit. The high image quality processing unit 116 serves as the super-resolution processing unit. The averaging filtering process and the time median filtering process serve as the fluctuation removal process. The non-rigid body registration process serves as the other fluctuation removal process.

It should be understood by those skilled in the art that various modifications, combinations, sub-combinations and alterations may occur depending on design requirements and other factors insofar as they are within the scope of the appended claims or the equivalents thereof.

For instance, in the above-described embodiment, description has been made as if the mode of the image processing apparatus 100 is the information processing apparatus. However, the image processing apparatus 100 according to the embodiment may be configured as part of an imaging device. In this case, the image processing apparatus 100 includes an optical system to which the light reflected by the subject enters, and a photoelectric conversion element for photoelectric converting the light entered through the optical system. The imaged data converted to an electric signal by the photoelectric conversion element is input to the image input unit 102 as a photographed image. An A/D converter may be arranged in the pre-stage of the image input unit 102, so that the imaged data input as an analog signal is digitalized, and then input to the image input unit 102. According to such configuration, the image processing apparatus 100 can function as the imaging device.

The present application contains subject matter related to that disclosed in Japanese Priority Patent Application JP 2008-302279 filed in the Japan Patent Office on 27 Nov. 2008, the entire content of which is hereby incorporated by reference.

What is claimed is:

1. An image processing apparatus comprising:
    a dynamic body detecting means for detecting a dynamic body contained in a moving image at a detection time point;
    a dynamic body region setting means for setting a dynamic body region which contains a part of the dynamic body as a reference region and maintaining the dynamic body region at a fixed position for a predetermined time period after the detection time point, the predetermined time period representing a duration of a plurality of time-series images; and
    a fluctuation removable processing means for performing a fluctuation removal process on a region other than the dynamic body region set by the dynamic body region setting unit;

wherein the fluctuation removal processing means performs other fluctuation removal process on part or the entire dynamic body region set by the dynamic body region setting means such that a video of the dynamic body contained in the dynamic body region does not disappear.

2. The image processing apparatus according to claim 1 further comprising a super-resolution processing means for performing a super-resolution process on part of or the entire dynamic body region not performed with the other fluctuation removal process by the fluctuation removal processing means of the dynamic body region set by the dynamic body region setting means.

3. The image processing apparatus according to claim 2, wherein
the fluctuation removal process performed on an entire region of the moving image excluding the dynamic body region by the fluctuation removal processing means is an averaging process or a median process of a pixel value contained in each frame of the moving image, and
the fluctuation removal process performed on the dynamic body region is a fluctuation removal process based on a non-rigid body registration.

4. An image processing method comprising the steps of:
detecting a dynamic body contained in a moving image at a detection time point;
setting a dynamic body region which contains a part of the dynamic body as a reference region and maintaining the dynamic body region at a fixed position for a predetermined time period after the detection time point, the predetermined time period representing a duration of a plurality of time-series images;
performing a first fluctuation removal process on an entire region of the moving image excluding the dynamic body region set in the dynamic body region setting step; and
performing a second fluctuation removal process on part or the entire dynamic body region set in the dynamic body region step such that a video of the dynamic body in the dynamic body region does not disappear.

5. A non-transitory computer readable medium having stored thereon a program that when executed by a computer causes the computer to execute:
a dynamic body detecting function for detecting a dynamic body contained in a moving image at a detection time point;
a dynamic body region setting function for setting a dynamic body region which contains a part of the dynamic body as a reference region and maintaining the dynamic body region at a fixed position for a predetermined time period after the detection time point, the predetermined time period representing a duration of a plurality of time-series images;
a first fluctuation removable processing function for performing a fluctuation removal process on an entire region of the moving image excluding the dynamic body region set by the dynamic body region setting function; and
a second fluctuation removable processing for performing a second fluctuation removal process on part or the entire dynamic body region set in the dynamic body region step such that a video of the dynamic body in the dynamic body region does not disappear.

6. An image processing apparatus comprising:
a dynamic body detecting processing circuit configured to detect a dynamic body contained in a moving image at a detection time point;
a dynamic body region setting processing circuit configured to set a dynamic body region which contains a part of the dynamic body as a reference region and maintain the dynamic body region at a fixed position for a predetermined time period after the detection time point, the predetermined time period representing a duration of a plurality of time-series images; and
a fluctuation removable processing circuit configured to perform a fluctuation removal process on a region other than the dynamic body region set by the dynamic body region setting processing circuit;
wherein the fluctuation removal processing circuit performs other fluctuation removal process, in which a video of the dynamic body contained in the dynamic body region does not disappear, on part or the entire dynamic body region set by the dynamic body region setting processing circuit.

7. The image processing apparatus according to claim 6 further comprising a super-resolution processing circuit for performing a super-resolution process on part of or the entire dynamic body region not performed with the other fluctuation removal process by the fluctuation removal processing circuit of the dynamic body region set by the dynamic body region setting processing circuit.

8. The image processing apparatus according to claim 7, wherein
the fluctuation removal process performed on an entire region of the moving image excluding the dynamic body region by the fluctuation removal processing circuit is an averaging process or a median process of a pixel value contained in each frame of the moving image, and
the fluctuation removal process performed on the dynamic body region is a fluctuation removal process based on a non-rigid body registration.

* * * * *